(12) United States Patent
Samuel et al.

(10) Patent No.: US 11,558,287 B2
(45) Date of Patent: Jan. 17, 2023

(54) POLICY COMBINING UTILIZING PURPOSE

(71) Applicant: Cisco Technology, Inc., San Jose, CA (US)

(72) Inventors: Louis Gwyn Samuel, Wiltshire (GB); Mark Grayson, Berkshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/791,507

(22) Filed: Feb. 14, 2020

(65) Prior Publication Data

US 2021/0258245 A1    Aug. 19, 2021

(51) Int. Cl.
*H04L 45/30* (2022.01)
*G06Q 10/06* (2012.01)

(52) U.S. Cl.
CPC ......... *H04L 45/30* (2013.01); *G06Q 10/0637* (2013.01)

(58) Field of Classification Search
CPC ............. H04L 47/20; H04L 2012/5636; H04L 41/0213; H04L 41/5022; H04L 47/10; H04L 47/2441
See application file for complete search history.

(56) References Cited

U.S. PATENT DOCUMENTS

| | | |
|---|---|---|
| 9,860,812 B2 | 1/2018 | Tipton et al. |
| 10,075,343 B2 | 9/2018 | Burk et al. |
| 11,063,785 B2 | 7/2021 | Milescu et al. |
| 11,178,725 B2 | 11/2021 | Talebi Fard et al. |
| 2002/0122422 A1* | 9/2002 | Kenney ............... H04L 47/2425 370/392 |
| 2008/0225722 A1* | 9/2008 | Khemani ............... H04L 41/50 370/235 |
| 2008/0301332 A1 | 12/2008 | Butler et al. |
| 2013/0111038 A1 | 5/2013 | Girard |

(Continued)

FOREIGN PATENT DOCUMENTS

| | | |
|---|---|---|
| EP | 2953398 B1 | 6/2018 |
| WO | 2019197016 A1 | 10/2019 |
| WO | 2021045859 A1 | 3/2021 |

OTHER PUBLICATIONS

3GPP, "3rd Generation Partnership Project; Technical Specification Group Core Network and Terminals; Representational State Transfer (REST) reference point between Application Function (AF) and Protocol Converter (PC) (Release 15)", 3GPP TS 29.201 V15.0.0 (Sep. 2017), 36 pages.

(Continued)

*Primary Examiner* — Ayaz R Sheikh
*Assistant Examiner* — Debebe A Asefa
(74) *Attorney, Agent, or Firm* — Edell, Shapiro & Finnan, LLC

(57) ABSTRACT

Techniques are described to provide for the ability to combine policies in a manner that utilized policy purposes to generate a combined policy. In one example, a method includes obtaining, at a network entity of a network, a plurality of policies, wherein each policy is associated with a policy purpose defined by a policy originator; combining the plurality of policies by the network entity to generate a combined policy, wherein the combining is performed based on a ranking of policy purposes; and enforcing the combined policy at one or more policy enforcement entities of the network for one or more packet flows communicated between a client and the network.

20 Claims, 9 Drawing Sheets

(56) References Cited

U.S. PATENT DOCUMENTS

| | | | |
|---|---|---|---|
| 2013/0176908 | A1 | 7/2013 | Baniel et al. |
| 2014/0089500 | A1 | 3/2014 | Sankar et al. |
| 2014/0161055 | A1 | 6/2014 | Chitrapu et al. |
| 2014/0226469 | A1* | 8/2014 | Stewart .................. H04L 47/20 370/230 |
| 2015/0327114 | A1 | 11/2015 | Gupta et al. |
| 2016/0095017 | A1 | 3/2016 | Ely et al. |
| 2016/0112239 | A1 | 4/2016 | Kanugovi et al. |
| 2016/0164825 | A1 | 6/2016 | Riedel et al. |
| 2016/0164826 | A1 | 6/2016 | Riedel et al. |
| 2016/0191635 | A1 | 6/2016 | Greenan et al. |
| 2016/0359673 | A1 | 12/2016 | Gupta et al. |
| 2016/0360464 | A1 | 12/2016 | Han et al. |
| 2017/0118687 | A1 | 4/2017 | Tipton et al. |
| 2017/0311197 | A1 | 10/2017 | Lopes et al. |
| 2018/0097725 | A1 | 4/2018 | Wood et al. |
| 2019/0069194 | A1 | 2/2019 | Jun et al. |
| 2019/0182165 | A1 | 6/2019 | Yang et al. |
| 2019/0268375 | A1 | 8/2019 | Gundavelli et al. |
| 2019/0268777 | A1 | 8/2019 | Simon et al. |
| 2019/0274178 | A1 | 9/2019 | Salkintzis et al. |
| 2019/0306752 | A1 | 10/2019 | Lai |
| 2019/0373505 | A1 | 12/2019 | Jun et al. |
| 2019/0394279 | A1 | 12/2019 | Dao et al. |
| 2019/0394833 | A1 | 12/2019 | Talebi Fard et al. |
| 2021/0006491 | A1 | 1/2021 | Amend et al. |
| 2021/0007166 | A1 | 1/2021 | Liao et al. |
| 2021/0092645 | A1 | 3/2021 | Grayson et al. |
| 2021/0092664 | A1 | 3/2021 | Lai et al. |
| 2021/0105660 | A1 | 4/2021 | Jeong et al. |
| 2021/0120596 | A1 | 4/2021 | Youn et al. |
| 2021/0135944 | A1 | 5/2021 | S et al. |
| 2021/0152513 | A1 | 5/2021 | Grayson et al. |

OTHER PUBLICATIONS

Ford, A. et al., "Architechtural Guidelines for Multipath TCP Development", Internet Engineering Task Force, Mar. 2011, 28 pages.

Welzl, M. et al., "A Minimal Set of Transport Services for End Systems draft-eitf-taps-minset-11", TAPS, Sep. 27, 2018, 50 pages.

Trammell, B. Ed. et al., "An Abstract Application Layer Interface to Transport Services draft-ietf-taps-interface-05", TAPS Working Group, Nov. 4, 2019, 64 pages.

Trammell, B. Ed. et al., "An Abstract Application Layer Interface to Transport Services draft-ietf-taps-interface-04", TAPS Working Group, Jul. 8, 2019, 64 pages.

Brunstrom, A. Ed. et al., "Implementing Interface to Transport Services draft-ietf-taps-impl-05", TAPS Working Group, Nov. 4, 2019, 48 pages.

Pauly, T. Ed. et al., "An Architecture for Transport Services draft-ietf-taps-arch-5", TAPS Working Group, Nov. 4, 2019, 26 pages.

Pauly, T. Ed. et al., "An Architecture for Transport Services draft-ietf-taps-arch-4", TAPS Working Group, Jul. 8, 2019, 25 pages.

Pauly, T. Ed. et al., "An Architecture for Transport Services draft-ietf-taps-arch-3", TAPS Working Group, Mar. 11, 2019, 25 pages.

5G Working Group, "Unlicensed Integration with 5G Networks" WBA Member, Oct. 2018, 63 pages.

Brossard, David et al., "Architecture", Axiomatics, Jul. 15, 2014, 7 pages. retrieved from Internet Aug. 13, 2019; https://www.axiomatics.com/blog/understanding-xacml-combining-algorithms/.

Ashley, Paul et al., "The Enterprise Privacy Authorization Language (EPAL)—How to Enforce Privacy throughout an Enterprise", 8 pages. retrieved from Internet Aug. 13, 2019; https://www.w3.org/2003/p3p-ws/pp/ibm3.html.

Welzl, M. et al., "On the Usage of Transport Features Provided by IETF Transport Protocols", Internet Engineering Task Force (IETF), Feb. 2018, 56 pages.

Ramli, Carroline Dewi Puspa Kencana, "Modelling and Analysing Access Control Policies in XACML 3.0", DTU Library, DTU Compute PHD-2015, No. 364, 2015, 240 pages, retrieved from Internet Aug. 13, 2019; orbit.dtu.dk.

Lochhart, Hal et al., "OASIS extensible Access Control Markup Language (XACML) TC", OASIS Open Standards. Open Sourse., 9 pages. retrieved from Internet Aug. 13, 2019; https://www.oasis-open.org/committees/tc_home.php?wg_abbrev=xacml.

Sardara, Mauro et al., "A Transport Layer and Socket API for (h)ICN: Design, Implementation and Performance Analysis", ICN 18, Sep. 21-23, 2018, Boston, MA, 11 pages.

Reeve, David C., "A New Blueprint For Network QoS", Aug. 2003, 217 pages.

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 16)", 3GPP TS 29.274 V16.1.0 (Sep. 2019), 400 pages.

3GPP, "3rd Generation Partnership Project; Technical Specification Group Core Network and Terminals; Access Network Discovery and Selection Function (ANDSF) Management Object (MO) (Release 15)", 3GPP TS 24.312 V15.0.0 (Jun. 2018), 394 pages.

3GPP, "3rd Generation Partnership Project; Technical Specification Group Core Network and Terminals; Mobile radio interface Layer 3 specification; Core network protocols; Stage 3 (Release 16)", 3GPP TS 24.008 V16.2.0 (Sep. 2019), 793 pages.

3GPP, "3rd Generation Partnership Project; Technical Specification Group Services and System Aspects; Policy and Charging Control Framework for the 5G System; Stage 2 (Release 16)", 3GPP TS 23.503 V16.1.0 (Jun. 2019), 99 pages.

3GPP, "3rd Generation Partnership Project; Technical Specification Group Services and System Aspects; Procedures for the 5G System; Stage 2 (Release 16)", 3GPP TS 23.502 V16.1.1 (Jun. 2019), 495 pages.

3GPP, "3rd Generation Partnership Project; Technical Specification Group Services and System Aspects; System Architecture for the 5G System; Stage 2 (Release 16)", 3GPP TS 23.501 V16.1.0 (Jun. 2019), 368 pages.

Dharmadhikari, Omkar, "5G Link Aggregation with Multipath TCP (MPTCP)", Cable Labs, Apr. 3, 2019, 18 pages. retrieved from Internet Aug. 13, 2019; https://www.cablelabs.com/5g-link-aggregation-mptcp.

Li, Ninghui et al., "A Formal Language for Specifying Policy Combining Algorithms in Access Control", Tech. Rep. Sep. 2008, 25 pages.

3GPP, 3rd Generation Partnership Project; Technical Specification Group Core Network and Terminals; Access to the 3GPP 5G Core Network (5GCN) via Non-3GPP Access Networks (N3AN); Stage 3 (Release 16), 3GPP TS 24.502 V16.2.0, Dec. 2019, 82 pages.

* cited by examiner

| P1/P2 | I1 | I2 | NA | IND |
|---|---|---|---|---|
| I1 | I1 | I1 | I1 | I1 |
| I2 | I1 | I2 | I2 | I2 |
| NA | I1 | I2 | NA | IND |
| IND | I1 | I2 | IND | IND |

FIG. 4

| RULE/POLICY | L1 | L2 | L1∧L2 | L1∨L2 | NA |
|---|---|---|---|---|---|
| C1 | I1 | I1 | I1 | I1 | I1 |
| C2 | I2 | I2 | I2 | I2 | I2 |
| C1∧C2 | I1 | I2 | I1∧I2 | I1∨I2 | I1∧I2 |
| C1∨C2 | I1 | I2 | I1∨I2 | I1∨I2 | I1∨I2 |
| NA | I1 | I2 | I1∧I2 | I1∨I2 | NA |

FIG.5

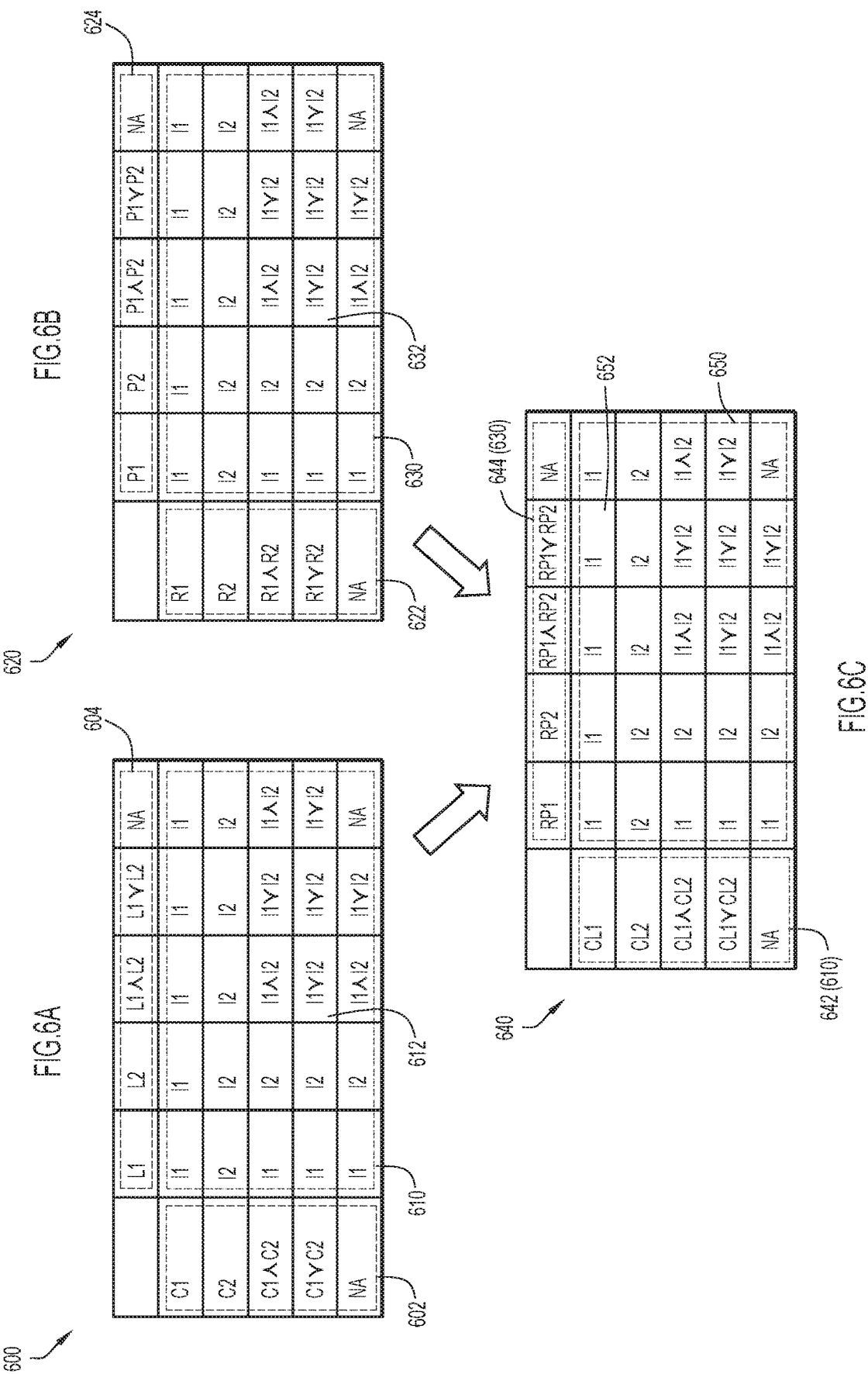

POLICY COMBINING UTILIZING PURPOSE

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of communication resources becomes more critical. In particular, there are significant challenges in managing multiple policies that may be applicable within mobile networking environments.

BRIEF DESCRIPTION OF THE DRAWINGS

FIG. 4 is a diagram illustrating example details associated with policy combining to generate a combined policy, according to an example embodiment.

FIG. 5 is a diagram illustrating example details associated with policy combining utilizing purpose to generate a combined policy, according to an example embodiment.

FIGS. 6A, 6B, and 6C are diagrams illustrating other example details associated with policy combining utilizing purpose to generate another combined policy, according to an example embodiment.

FIGS. 7A and 7B are diagrams illustrating yet other example details associated with policy combining utilizing purpose to generate another combined policy, according to an example embodiment.

DESCRIPTION OF EXAMPLE EMBODIMENTS

Overview

Figure 1:
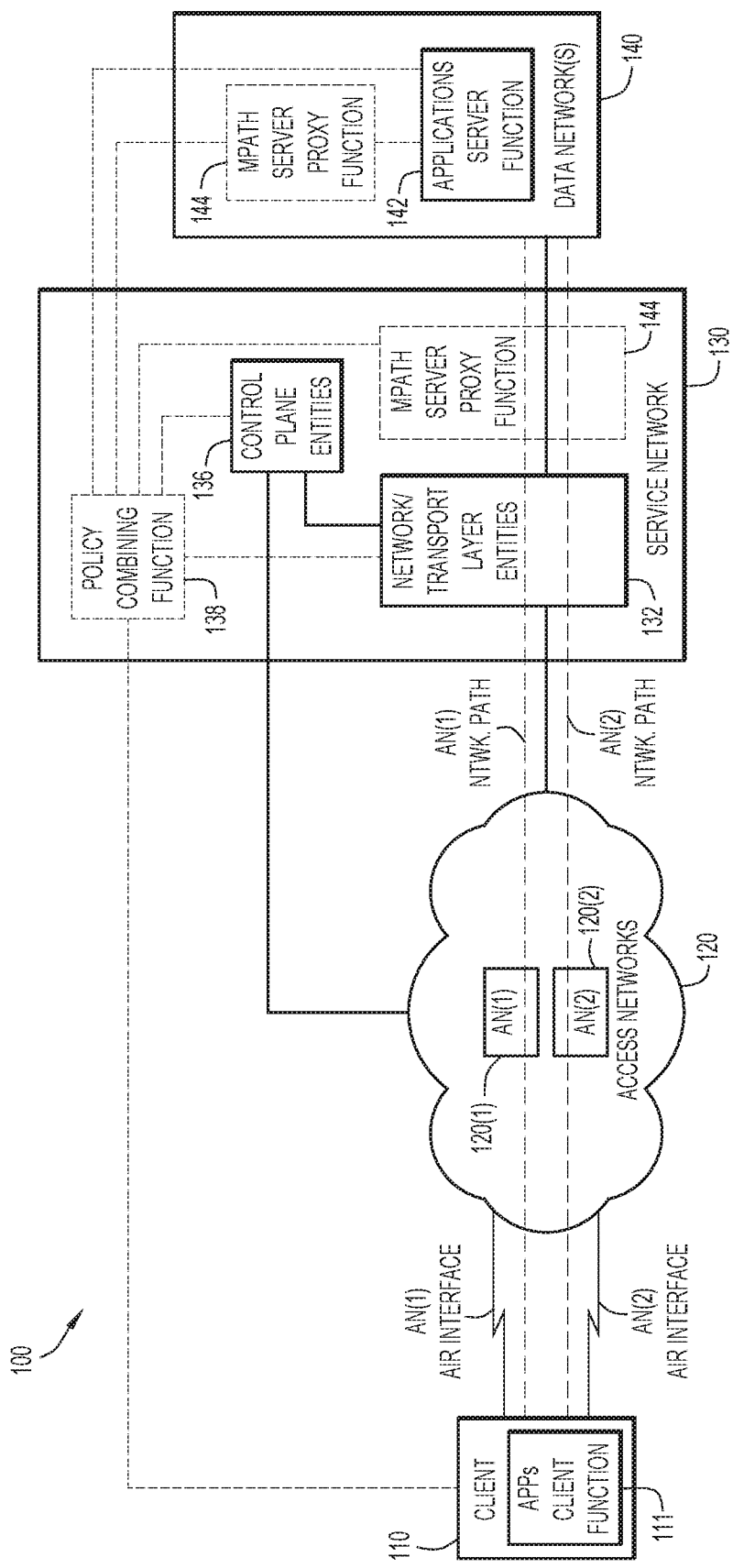
FIG. 1 is a diagram of a system in which techniques for policy combining utilizing purpose may be implemented, according to an example embodiment.

Techniques presented herein provide a system, apparatus, and/or method that enables policies to be combined from different policy originators in a manner that takes into account a purpose used by the originator in defining its policy. A ranked or otherwise ordered list of policy purposes can be utilized to determine how to combine different policies to generate a uniform policy that can be consistently applied at one or more policy enforcement points.

For example, a ranked order of policy purposes may have a particular highest ranked policy purpose and one or more lower ranked policy purposes. The combining techniques described herein may take into account the particular highest ranked policy purpose, which together with the purpose ranking, allows for effective combining of the policies.

Operationally, the combining techniques presented herein may provide that policy originators, or a proxy acting on their behalf, can exchange policy information, either bilaterally, or with a third-party function that is operable to combine and arbitrate between possible policy conflicts based on the ranked order of policies purposes, and to communicate information (e.g., a combined policy) to allow a consistent policy to be enforced across a set of policy enforcement points or entities.

In an example embodiment, a method is provided that includes obtaining, at a network entity of a network, a plurality of policies, wherein each policy is associated with a policy purpose defined by a policy originator; combining the plurality of policies by the network entity to generate a combined policy, wherein the combining is performed based on a ranking of policy purposes; and enforcing the combined policy at one or more policy enforcement entities of the network for one or more packet flows communicated between a client and the network.

Example Embodiments

A network that includes multiple access technology types for multiple access networks is often referred to as a heterogeneous network (HetNet). Different access technology types can include wired accesses (e.g., Ethernet, etc.) and/or over-the-air Radio Frequency (RF) accesses (typically referred to as Radio Access Technology (RAT) types), which can include wireless local area network (WLAN) access types such as Wi-Fi®, cellular access network types such as Third (3rd) Generation Partnership Project (3GPP) accesses, among others.

There are a number of different policies that can be defined in a HetNet. These policies can be defined by different policy originators. For example, a policy owner or originator may be an enterprise entity, a service provider, a device manufacturer, an application provider, an end user, etc. For embodiments discussed herein, a policy owner or originator may be network entity (e.g., node, user equipment (UE), device, etc.) provisioned or otherwise configured with one or more policies by any combination of an enterprise entity, a service provider, a device manufacturer, an application provider, an end user, etc. Generally, as referred to herein, a 'policy' can represent a collection of intent or goals (e.g., a purpose), sometimes characterized as 'rules', through which application of the policy (e.g., rules of the policy) can be utilized to realize the purpose of the policy.

Providing consistent enforcement of policies in a HetNet may involve combining different policies from different policy originators. A particular policy defined by a particular policy originator may be defined with a particular policy purpose in mind. For example, a policy may be defined with a purpose that seeks to optimize an application experience, to minimize costs incurred by a user, to prioritize an enterprise service, or to balance load in a service provider network.

Although some policy combining solutions may address how policies can be combined in a manner that deals with possible conflicting policies, such solutions have not dealt with policy combining involving divergent purposes used in defining specific policies.

Presented herein are techniques for policy combining utilizing purpose in a mobile network. Generic mechanisms are presented by which policy combining can be performed taking into account a variety of purposes. Although techniques presented herein describe features related to handling policies in a HetNet, the techniques described can be generally applicable to any environment in which different policies may be defined by different policy originators with different policy purposes.

Referring to FIG. 1, FIG. 1 is a block diagram of a system 100, also referred to herein as HetNet system 100, in which techniques for combining policy utilizing purpose may be implemented, according to an example embodiment. System 100 may include a client 110, access networks (ANs) 120, a service network 130, and one or more data network(s) 140.

Client 110 may include (e.g., be configured/provisioned with) one or more applications (apps), which may operate via an applications client function 111 provided for client 110. Client 110 may include policy combining logic (illustrated in FIGS. 2-3) that may operate to combine policies utilizing a ranked or ordered list of policy purposes and generate a combined policy according to techniques described herein and/or policy enforcement logic (also illustrated in FIGS. 2-3) to enforce one or more combined policies.

In various embodiments, client 110 may be associated with any electronic device, user equipment (UE), machine, robot, etc. wishing to initiate a flow in system 100. The terms 'device', 'electronic device', 'automation device', 'computing device', 'machine', 'robot', 'client', 'client device', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. Client 110 discussed herein may also be inclusive of a suitable interface to a human user such as a microphone, a display, a keyboard, or other terminal equipment. Client 110 discussed herein may also be any device that seeks to initiate a communication on behalf of another entity or element such as a program, a database, or any other component, device, element, or object capable of initiating an exchange within system 100. It is to be understood that any number of clients may be present in system 100.

Access networks (ANs) 120 may include any number of access networks such as a first access network AN(1) 120(1) and a second access network AN(2) 120(2). The access networks 120, which may be inclusive of Radio Access Networks (RANs), may include any combination of with radios [sometimes referred to as access points, which may include any combination of hardware (e.g., communications units, receiver(s), transmitter(s), antenna(s) and/or antenna array(s), processor(s), memory element(s), baseband processor(s) (modems), etc.)], controllers (e.g., wireless local area network controllers, etc.), software, logic, and/or any other elements/entities that may facilitate access network connections for one or more elements of system 100. Radios/access points for ANs 120 may include any combination of 4G/LTE evolved Node Bs (eNBs or eNodeBs), 5G/next generation NodeB (gNB), Wi-Fi® access points, and/or any other radio devices now known here or hereafter developed.

In various embodiments, ANs 120 may be any combination of licensed spectrum access networks, such as 3GPP access networks (e.g., 4th Generation (4G)/Long Term Evolution (LTE), 5th Generation (5G), next Generation (nG), etc. access networks), unlicensed spectrum non-3GPP access networks (e.g., Institute of Electrical and Electronic Engineers (IEEE) 802.11 (Wi-Fi®), IEEE 802.16 (WiMAX®), Wireless Local Area Network (WLAN), etc. access networks), unlicensed spectrum 3GPP access networks (e.g., License Assisted Access (LAA), enhanced LAA (eLAA), etc. access networks), and/or the like. Although only two access networks are illustrated in system 100, it is to be understood that any number of access networks may be present in a system in accordance with embodiments of the present disclosure.

Client 110 may interface with ANs 120 via over-the-air RF connections. For example, for the embodiment of FIG. 1, client 110 may be configured with hardware (e.g., communications units, receiver(s), transmitter(s), antenna(s) and/or antenna arrays, processor(s), memory element(s), baseband processor(s) (modems), etc.)], software, logic, and/or the like (e.g., a 4G cellular communications unit, a 5G cellular communications unit, a Wi-Fi® communications unit, etc.) to facilitate a first over-the-air interface for accessing the first access network AN(1) 120(1) via an AN(1) air interface and a second interface for accessing the second access network AN(2) 120(2) via an AN(2) air interface.

Service network 130 may include one or more network and/or transport (network/transport) layer entities 132 and one or more control plane entities 136. In some embodiments, service network 130 may include a multipath (mpath) server proxy function 144, which may facilitate multipath functionality, such as enforcement of multipath policies, for non-multipath aware/enabled applications operating in system 100. Client 110 may include a multipath client proxy function (not shown in FIG. 1) that may interface with multipath server proxy function 144 to perform combining techniques described herein. In various embodiments, service network 130 may be inclusive of a service provider (SP)/mobile network operator (MNO) network, enterprise network, and/or combinations thereof. Network/transport layer entities 132 may interface with access networks 120, data network(s) 140, and control plane entities 136. In various embodiments, multipath server proxy function 144, if implemented in service network 130, may be implemented external to and interface with network/transport layer entities 132 and data network(s) 140 or may be implemented as integrated with one or more network/transport layer entities 132.

Any combination of network/transport layer entities 132, control plane entities 136, and/or multipath server proxy function 144 may include policy combining logic (illustrated in FIGS. 2-3) that may operate to combine policies utilizing a ranked or ordered list of policy purposes and generate a combined policy according to techniques described herein and/or policy enforcement logic (also illustrated in FIGS. 2-3) to enforce one or more combined policies.

In some embodiments, service network 130 may include a policy combining function 138, which may be external to the network/transport layer entities 132 and/or the control plane entities 136 in which the policy combining function may include policy combining logic to combine policies utilizing a ranked or ordered list of policy purposes and generate a combined policy according to techniques described herein. For embodiments in which policy combining function 138 may be implemented, any combination of client 110, network/transport layer entities 132, control plane entities 136, applications server function 142, and/or multipath server proxy function 144 may interface with policy combining function.

In various embodiments, network/transport layer entities 132 may be inclusive of any number and/or combination of user plane entities including but not limited to 3GPP 4G/LTE user plane entities (e.g., Serving Gateway (SGW), Packet Data Network (PDN) Gateway (PGW), user plane SGW (SGW-U), user plane PGW (PGW-U), System Architecture Evolution Gateway (SAEGW), user plane SAEGW (SAEGW-U), or the like); 3GPP 5G user plane entities (e.g., User Plane Function (UPF); non-3GPP routers, switches, etc.; and/or the like now known here and/or hereafter developed. In various embodiments, control plane entities 136 may be inclusive of any number and/or combination of control plane entities including but not limited to 3GPP 4G/LTE control plane entities (e.g., Mobility Management Entity (MME), Policy and Charging Rules Function (PCRF), etc.); 3GPP 5G control plane entities (e.g., Session Management Function (SMF), Access and Mobility Management Function (AMF), Policy Control Function (PCF), etc.); 3GPP/non-3GPP authentication, authorization, and accounting (AAA) server/service; controller; and/or the like now known here and/or hereafter developed.

Data network(s) 140 may include an applications server function 142 with which one or more applications provided for client 110 may interface via the applications client function 111. If system 100 is configured to support non-multipath aware/enabled applications, in some embodiments multipath server proxy function 144 can be provided for data network(s) 140 (e.g., rather than within service network 130) and may be implemented internal or external to the applications server function 142.

In various embodiments, data networks(s) 140 may be any combination of the Internet, an Internet Protocol (IP) Multimedia Subsystem (IMS), enterprise network, Ethernet and/or Ethernet switching systems, and/or the like.

For system 100, any combination of client 110, applications client function 111, network/transport layer entities 132, control plane entities 136, multipath server proxy function 144, and applications server function 142 may be considered policy originators having one or more policies configured/provisioned/defined thereat.

Further, any combination of client 110, applications client function 111, network/transport layer entities 132, multipath server proxy function 144, and applications server function 142 may be considered policy enforcement points where combined policies are applied. In particular, the combined polices applied across a set of policy enforcement points supporting a particular set of flows between any combination of client 110 and service network 130 and/or client 110 and data network should be consistent. In order for consistent policies to be enforced within system 100, policy combining within system 100 can be defined according to a ranked order as may be set by various policy originators.

During operation, the combining techniques herein may include the policy originators, or a proxy acting on their behalf, exchanging policy information (e.g., policies and policy purpose information), either bi-laterally, or with a third-party function (e.g., policy combining function 138) to combine and arbitrate between possible conflicts using a combining algorithm or logic to generate a combined policy in which the combining is performed consistently by different entities within the system or by a third-party function and is consistently enforced by a set of one or more policy enforcement entities. The combining algorithm or logic that may be utilized by one or more network entities may utilize established combining techniques (e.g., 'weak consensus') to avoid policy conflicts and may be enhanced to account for an ordered list of purposes.

In one embodiment, for example, HetNet system 100 may be defined such that policies can be used to determine which path(s) out of multiple paths (e.g., AN(1) network path and/or AN(2) network path) are to be utilized to convey packet flows for client 110. In particular, the policy definition enables a policy to be defined whether to send a flow over:

AN(1) network path (e.g., corresponding to a Wi-Fi network)

AN(2) network path (e.g., corresponding to a cellular network)

AN(1) network path or AN(2) network path

AN(1) network path or AN(2) network path

For example, a service provider policy may be defined to optimize resource utilization of installed equipment, thereby providing for a purpose associated with balancing the load (L) across the set of available paths. In another example, a user defined policy may be defined to provide for a purpose associated with optimizing incurred costs (C). In still another example, an application provider defined policy may be defined for a purpose associated with optimizing the performance (P) of packet flows associated with their service. In still another example, an enterprise defined policy may be defined for a purpose associated with optimizing the resiliency (R) of the flows associated with business applications. These example policy purposes are only a few of the many different policy purposes that may be defined by/for policy originators and are not meant to limit the broad scope of the present disclosure. Virtually any other policy purposes may be defined and, thus, are clearly within the scope of the present disclosure.

During operation of system 100, policy originators (e.g., network entities) such as any combination of client 110/applications client function 111, network/transport layer entities 132, control plane entities 136, applications server function 142, and/or multipath server proxy function 144 may exchange policy information including one or more policies and a policy purpose associated with each of the one or more policies to affect optimized policy combining within system 100.

A ranked or otherwise ordered (e.g., prioritized) list of purposes can be used to combine policies having different policy purposes. For example, a 'cost first' combining algorithm or logic can be defined as C>L>R>P, where the greater than '>' symbol is used to define an order of purpose priority that is to be utilized by the policy combining algorithm or logic to generate a combined policy. Alternatively, a 'performance first' combining algorithm or logic can be defined as P>R>L>C (e.g., the order of the cost first combining algorithm is complemented).

In at least one embodiment, policy combining operations may be based on an extensible Access Control Markup Language (XACML) combining process, which can be extended to account for combining based on a ranked or otherwise ordered list of policy purposes. In general, the conventional XACML policy combining process produces binary decisions such as: Permit (P), Deny (D), Not Applicable (NA), or Indeterminate (IND), which can be applied using various combining algorithms such as 'Permit-Overrides', 'Deny-Overrides', 'Deny-Unless-Permit', as are generally understood in the art. Conventionally, D>P>IND>NA represents a Deny-Overrides combining algorithm. Various combining algorithms or logic that may be utilized by one or more network entities of system 100 are discussed in further detail below with reference to FIGS. 4, 5, 6A-6C, and 7A-7B.

In a further embodiment, the combining may take place in a hierarchical fashion. For example, a user-centric view may be focused on cost and resilience (e.g., R>C or C>R), whereas a carrier-centric view may be focused on performance and load (e.g., P>L or L>P). In such an embodiment, a user-centric exchange may then occur between a user device (e.g., client 110) as a policy originator and enforcement point or their proxy and a multipath enabled application server or its proxy (e.g., multipath server proxy function 144) as a policy originator/enforcement point to agree on a policy that is combined utilizing to cost and resiliency purposes.

In various embodiments, a combining algorithm or logic defining a ranked or otherwise ordered/prioritized list of prioritized purposes can be configured at one or more network entities, signaled between network entities during policy exchanges, pushed to network entities from one or more policy functions, databases, etc., pulled by network entities from one or more policy functions, databases, etc., negotiated between network entities (e.g., via one or more exchanges), combinations thereof, and/or the like.

In addition and/or in lieu of such a user-centric exchange, a carrier-centric exchange may also occur between carrier gateway functionality (e.g., a network/transport layer entity 132) as a policy originator/enforcement point and an end user device (client 110) via the client 110 operating system (OS)/transport layer (not shown in FIG. 1) in which both the gateway functionality and the client 110 are responsible for mapping application packet flows to specific access networks (e.g., client 110 for uplink packet transmissions toward service/data networks 130/140 and network/transport layer entity 132 for downlink packet transmissions toward client 110 for one or more applications).

In still another embodiment, an inter-system exchange of policies between the two systems can be used to affect a global policy which takes into account the user-centric purposes and the carrier-centric purposes to generate a combined policy that can be enforced within the system. For example, a client 110 Application Programming Interface (API) may be implemented as a Transport Services (TAPS) API, as may be defined at least by the Internet Engineering Task Force (IETF) draft https://tools.ietf.org/html/draft-ietf-taps-interface-04#ref-I-D.ietf-taps-arch, and may be used to generate and enforce one or more combined policies and/or delegate generation and/or enforcement of one or more combined policies to other logic for client 110. In general, the Transport Services architecture defines a model for exposing transport protocol features to applications that allows applications to use such protocol features flexibly for network communications (e.g., application packet flows).

Although example discussions herein illustrate example details associated with network/path selection features, other types of policy purposes and types of policy enforcement may be provided in accordance with teachings of this disclosure. For example, in some embodiments, workload placement policies may be defined with different purposes (e.g., resiliency, cost, sovereignty, etc.) that may be combined to determine in which compute location(s) to place a workload. Accordingly, other policy purposes and types of policy enforcement can be envisioned.

Figure 2:
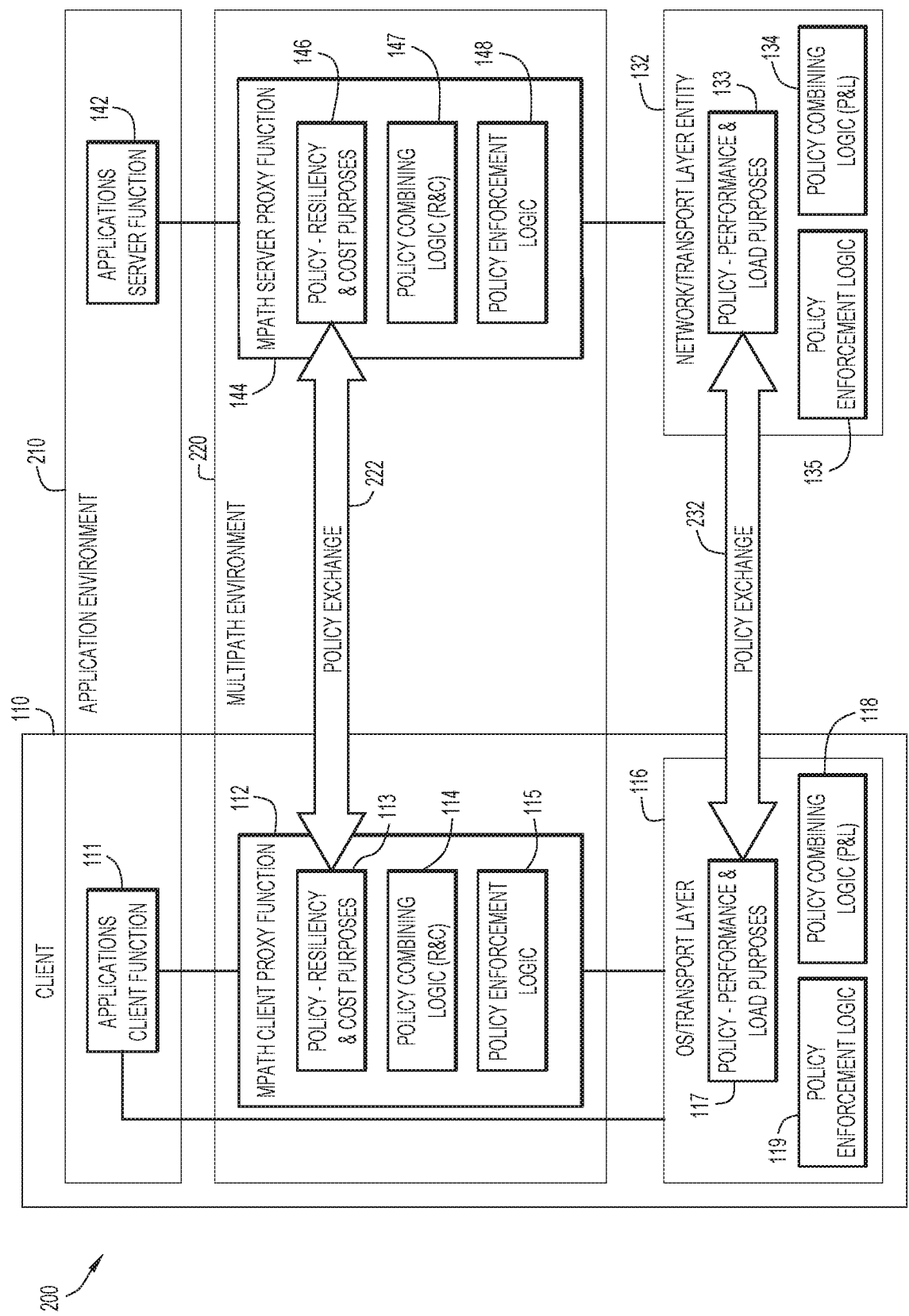
FIGS. 2 and 3 are block diagrams illustrating various example policy exchange and combining environments that may be implemented for the system of FIG. 1, according to an example embodiment.
Figure 3:
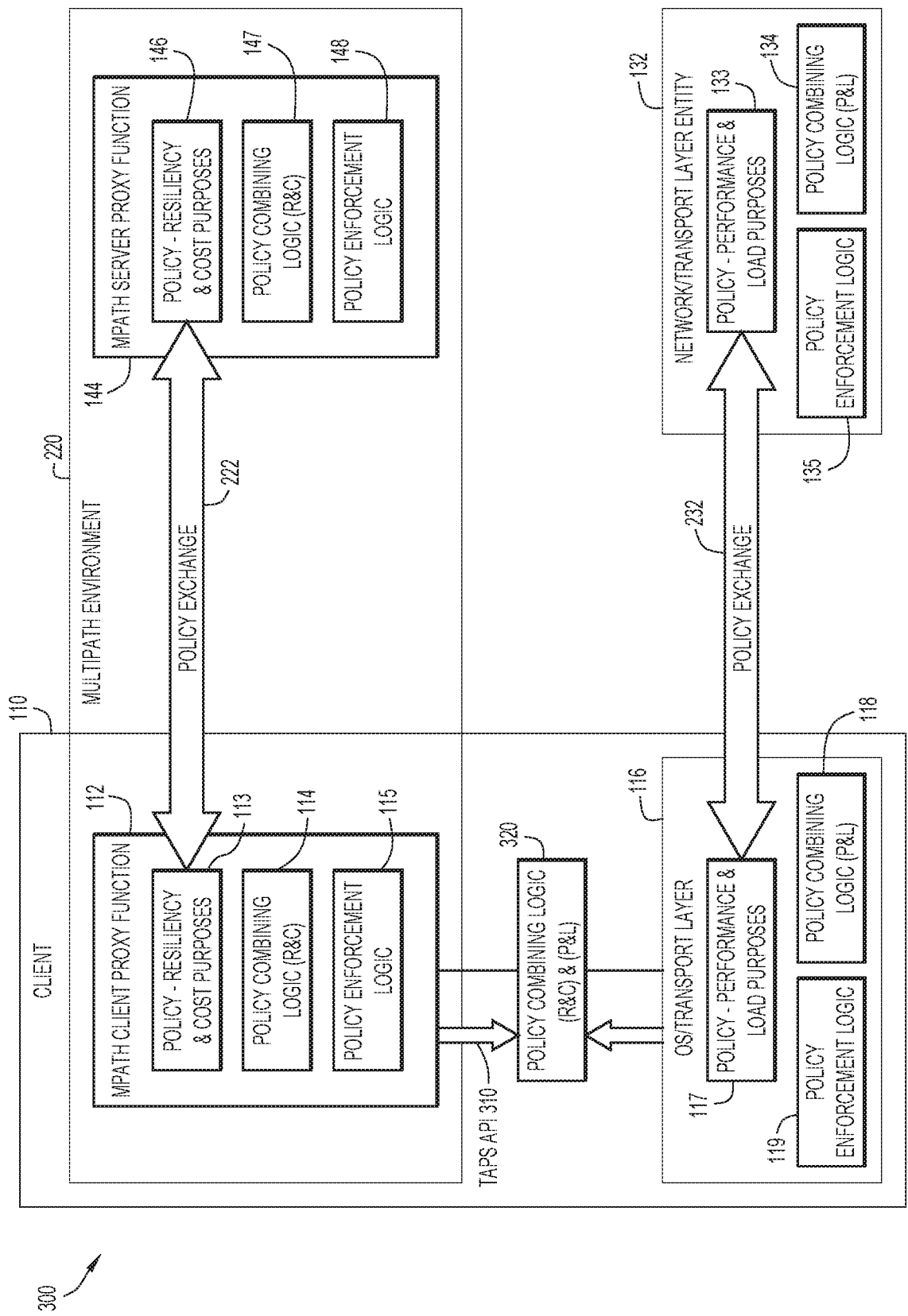

Consider various example details illustrated for FIGS. 2 and 3, which are block diagrams illustrating various example policy exchange and combining environments that may be implemented for the system of FIG. 1 to facilitate network/path selection, according to various example embodiments.

Referring to FIG. 2, FIG. 2 is a block diagram 200 that includes client 110, a network/transport layer entity 132, applications server function 142, and multipath server proxy function 144 of the system 100 of FIG. 1. Other details illustrated in FIG. 1 such as access networks 120, service network 130, data network(s) 140, control plane entities 136, and policy combining function 138 are not illustrated in FIG. 2 for purposes of brevity only in order to illustrate other example details that may be associated with policy combining operations that may be performed within system 100, according to various example embodiments. Reference may be made to FIG. 1 in connection with the description for FIG. 2

In addition, applications client function 111 illustrated for client 110 in FIG. 1, client 110 may also include an OS/transport layer 116 that may interface, at least in part, with applications client function 111. In general, OS/transport layer 116 may facilitate operations for client 110 and may include hardware, software, logic, etc. to provide various interfaces that may facilitate network connections for connecting client 110 with access networks 120 (not shown in FIG. 2).

Policy information 117 (e.g., one or more policies and corresponding policy purposes) may be defined/configured and/or obtained (e.g., via an exchange between client 110 and any external database/entity/etc.) for OS/transport layer 116. In at least one embodiment, OS/transport layer 116 may also include policy combining logic 118 and policy enforcement logic 119. One or more combining algorithms or logic may be provisioned and/or obtained (e.g., via an exchange between client 110 and any external database/entity/etc.) for policy combining logic 118 in order to perform policy combining in a manner that utilizes policy purpose, as discussed for embodiments presented herein. Policy enforcement logic 119 may facilitate the enforcement of one or more combined policies, which may include, for example, selecting one or more interface(s) (e.g., any combination of a 4G cellular communications unit, a 5G cellular communications unit, a Wi-Fi® communications unit, etc.) for client 110 for communicating with one or more access networks for one or more packet flows to be transmitted by client 110 (e.g., for one or more applications).

Network/transport layer entity 132 may additionally include policy information 133 (e.g., one or more policies and corresponding policy purposes), which may be defined/configured and/or obtained (e.g., via an exchange with any external database/entity/etc.) for network/transport layer entity 132. In various embodiments, network/transport layer entity 132 may include any combination of policy combining logic 134 and/or policy enforcement logic 135. One or more combining algorithms or logic may be provisioned and/or obtained (e.g., via an exchange with any external database/entity/etc.) for policy combining logic 134 in order to perform policy combining in a manner that utilizes policy purpose, as discussed for embodiments presented herein. Policy enforcement logic 135 may facilitate the enforcement of one or more combined policies, which may include, for example, selecting one or more access network path(s) for transmitting one or more packet flows that are to be communicated to client 110.

For embodiments involving access network/network path selection by OS/transport layer 117 and/or network/transport layer entity 132, enforcing a combined policy may include various operations such as, for example, identifying a particular packet/application packet flow as matching a particular combine rule, selecting an interface (e.g., a radio configured for a communications unit of the client 110 associated with a particular access type or a network connection configured for a communications unit of network/transport layer entity 132 associated with a particular network connection for a particular access type) associated with access network(s)/network connection(s) identified by the particular combined rule, and causing one or more packets associated with the application packet flow to be transmitted using the selected interface(s).

For embodiments in which multipath client function 112 may be configured with policy enforcement logic 115, as discussed below, the policy enforcement logic 119 may be not be provided for OS/transport layer 117 or policy enforcement logic 119 may be configured to provide a subset of policy enforcement logic (e.g., for policy enforcement operations that may not be performed by policy enforcement logic 115 of multipath client proxy function 112).

In various embodiments, identifying a particular packet/application packet flow as matching a particular combined rule may include any technique such as, for example, matching a particular combined rule to a particular packet/packet flow using any combination of a Traffic Flow Template (TFT) (e.g., as may be prescribed at least by 3GPP TS 29.274 and TS 24.008), tuple information (e.g., source/destination address, port, etc.), an application identifier, an application instance identifier, and/or the like and selecting a corresponding interface for a corresponding access network/network path for transmitting the packet/application packet flow.

In some embodiments, client 110 may additionally include a multipath client proxy function 112 that may be utilized for policy combining and/or policy enforcement operations for non-multipath enabled applications that may be operating for client 110 via applications client function 111. Policy information 113 (e.g., one or more policies and corresponding policy purposes) may be defined/configured and/or obtained (e.g., via any external database/entity/etc.) for multipath client proxy function 112. In various embodiments, multipath client proxy function 112 may include any combination of policy combining logic 114 and/or policy enforcement logic 115. One or more combining algorithms or logic may be provisioned and/or obtained (e.g., via an exchange with any external database/entity/etc.) for policy combining logic 114 in order to perform policy combining in a manner that utilizes policy purpose, as discussed for embodiments presented herein. Policy enforcement logic 115 may facilitate the enforcement of one or more combined policies for embodiments in which the multipath client proxy function 112 may enforce one or more combined policies.

Policy information 146 (e.g., one or more policies and corresponding policy purposes) may also be defined/configured and/or obtained (e.g., via any external database/entity/etc.) for multipath server proxy function 144. In various embodiments, multipath server proxy function 144 may any combination of include policy combining logic 147 and/or policy enforcement logic 148. One or more combining algorithms or logic may be provisioned and/or obtained (e.g., via an exchange with any external database/entity/etc.) for policy combining logic 147 in order to perform policy combining in a manner that utilizes policy purpose, as discussed for embodiments presented herein. Policy enforcement logic 148 may facilitate the enforcement of one or more combined policies (e.g., selecting network path(s) for downlink packets to be communicated to client 110) for embodiments in which the multipath server proxy function 144 may enforce one or more combined policies.

An applications environment 210 is shown in FIG. 2 that may be associated with operations performed for various applications operating and communicating (transmitting/receiving) packet flows between applications client function 111 and applications server function 142. In one example, the selection of access networks/network paths associated with communicating packet flows between applications client function 111 and applications server function may be facilitated via the combining of multiple policies having purposes defined by the policy originators of system 100 according to a given combining algorithm/logic in order to generate a consistent combined policy (if policy is to be combined at multiple network entities) that is to be consistently enforced at one or more policy enforcement points of system 100.

Consider a first example, which may involve a multipath environment 220 that may facilitate user- or client-centric policy combining/enforcement operations for non-multipath enabled applications that may be operating via application client function 111. In this example, a policy exchange 222 may be performed between multipath client proxy function 112 and multipath server proxy function 144 to exchange policy information 113/146 that may be associated with resiliency (R) and cost (C) policies/purposes.

In at least one embodiment, the policy exchange 222 may be facilitated using approaches such as exchanging enhanced multipath transmission control protocol options (MP-TCP or MPTCP, as defined at least by IETF RFC 6182) to signal a policy and a corresponding policy purpose from one entity to another (e.g., between multipath client proxy function 112 and multipath server proxy function 144). Other techniques for signaling policy/policy purpose can be envisioned such as, for example, a 5G-defined service based architecture. Policy purpose (e.g., cost, resiliency, performance, load, etc.) may be indicated for embodiments discussed herein using a flag type, setting a bit index of a multi-bit value or a byte value, Type-Length-Value (TLV) objects, attribute value pairs (AVPs), combinations thereof, and/or the like.

Following the policy exchange, each of multipath client proxy function 112 via policy combining logic 114 and multipath server proxy function 144 via policy combining logic 147 may combine the exchanged resiliency (R) and cost (C) policies according to a given combining algorithm (e.g., C>R or R>C) provisioned for each of the functions to generate a combined resiliency and cost (R&C) policy that is enforced via policy enforcement logic 115 of multipath client proxy function 112 for client 110 and policy enforcement logic 148 of multipath server proxy function 144 for one or more application flows.

Consider a second example, which may involve a policy exchange 232 that may facilitate carrier-centric policy combining/enforcement operations for one or more application flows associated with client 110. In this example, policy exchange 232 may be performed between OS/transport layer 116 and any of network/transport layer entity 132 and/or one or more control plane entities 136 of service network 130 to exchange policy information 117/133 that may be associated with performance (P) and load (L) policies/purposes.

In various embodiments, the policy exchange 232 may be facilitated via enhanced 3GPP signaling such as enhanced Non-Access Stratum (NAS) signaling between client 110 and network/transport layer entity 132 and/or one or more control plane entities 136 of service network 130. For example, in one embodiment, procedures prescribed in 3GPP Technical Specification (TS) 24.502 may be enhanced such that the client 110 may signal policy information to service network 130 via one or more fields, etc. added to and/or augmented for a Protocol Data Unit (PDU) create session request sent to service network 130. In another exchange, network/transport layer entity 132 and/or one or more control plane entities 136 of service network 130 may signal policy information to client 110 (e.g., via an enhanced create session response, etc.). Other messaging/signaling exchanges to exchange policy information can be envisioned.

Following the policy exchange, each of OS/transport layer 116 112 via policy combining logic 118 and network/transport layer entity 132 via policy combining logic 134 may combine the exchanged performance (P) and load (L) policies according to a given combining algorithm (e.g., P>L or L>P) provisioned for each of the functions to generate a combined performance and load (P&L) policy that is enforced via policy enforcement logic 119 of OS/transport layer 116 for client 110 and policy enforcement logic 135 of network/transport layer entity 132 for one or more application flows.

As noted above, in some embodiments, an inter-system exchange of policies between the two systems can be used to affect a global policy which may take into account client-centric purposes and carrier-centric purposes to generate a combined policy that can be enforced within the system 100. Referring to FIG. 3, FIG. 3 is a block diagram 300 that includes client 110, network/transport layer entity 132, and multipath server proxy function 144 of the system 100 of FIG. 1. The application environment 212 of FIG. 2 is not shown in FIG. 3 for purposes of brevity only in order to illustrate other example details that may be associated with policy combining operations that may be performed by system 100, according to various example embodiments. Reference may be made to FIGS. 1 and 2 in connection with the description for FIG. 3.

Consider for the embodiment of FIG. 3 that client 110 is provisioned with a TAPS API 310 that may facilitate an inter-system exchange between the multipath environment 220 and the network/transport layer of system 100 in order to enable hierarchical combining in which the combined R&C policy generated from the multipath environment and the combined P&L policy from the network/transport layer can be further combined via additional policy combining logic 320 that may be provisioned for client 110 in order to perform policy combining utilizing a ranked or otherwise ordered list of policy purposes (e.g., as a performance-over-cost combining algorithm such as R>C>P>L or R>P>C>L, etc.). to generate a combined policy (e.g., a R&C&P&L combined policy) that may be communicated to policy enforcement logic 119 for enforcing access network selections for one or more application flows to be transmitted in system 100.

Although FIGS. 2 and 3 illustrate policy combining logic 118 for OS/transport layer 116, policy combining logic 114 for multipath client proxy function 112, policy combining logic 134 for network/transport layer entity 132, and policy combining logic 147 for multipath server proxy function 144, in some embodiments as discussed herein, policy combining may be performed external to client 110. For example, in at least one embodiment, various policy originators (e.g., network entities) of system 100 may signal policy information (e.g., policy and policy purpose) to policy combining function 138 (using any appropriate signaling techniques). Policy combining function 138 can combine any policies obtained via a combining algorithm/logic utilizing a ranked or otherwise ordered list of policy purposes provisioned and/or obtained for policy combining function 138 in order to generate a combined policy. The combined policy can then be signaled to one or more policy enforcement points, which may or may not be the policy originators.

Thus, described herein are techniques that enable the purpose of policies to be additionally exchanged when signaling policy information to affect an optimized policy combining algorithm. Prior implementations of loosely coupled systems (e.g., application environments, multipath environments, etc.) typically involved some kind of rigidity in bringing the systems together to achieve an outcome. However, embodiments involving the combining techniques discussed herein provide an inclusive mechanism for disjointed/loosely coupled system to be utilized through the inclusion of policy from such loosely coupled systems that can be combined in uniform (e.g., uniform across a network) but fuzzy or non-binary manner while taking into account preference and/or policy purpose (which can be varied across the loosely coupled system) and then applied at one or more policy enforcement points or entities of the network.

As noted above with regard to policy combining, in at least one embodiment, policy combining operations may be based on an XACML combining process, which can be extended to account for combining based on a ranked or otherwise ordered list of policy purposes.

Figure 4:
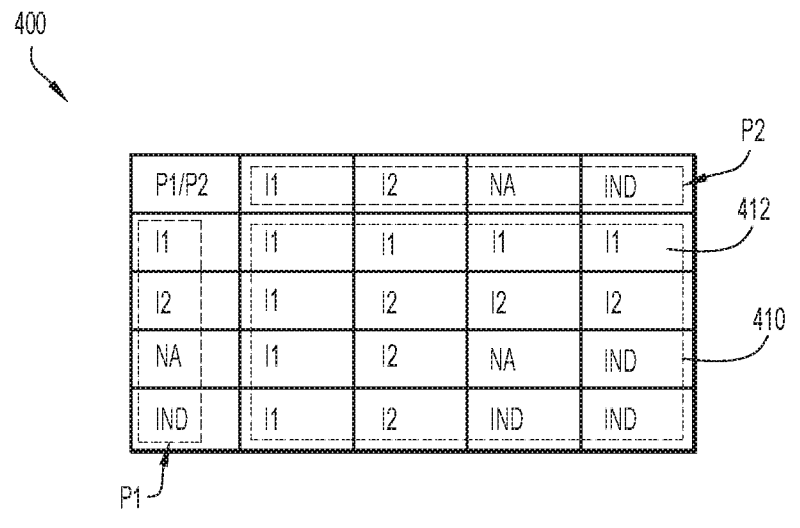

Referring to FIG. 4, FIG. 4 is a table 400 illustrating example details associated with a combining process for combining a first policy (P1) with a second policy (P2) to generate a combined policy 410 including a number of combined rules 412, according to an example embodiment.

As noted above, the conventional XACML policy combining process produces binary decisions such as: Permit (P), Deny (D), Not Applicable (NA), or Indeterminate (IND), which can be applied using various combining models such as 'Permit-Overrides', 'Deny-Overrides', 'Deny-Unless-Permit', as are generally understood in the art.

In at least one embodiment, conventional XACML policy combining processes can be applied to access network/network path selections such that binary decisions of either preferring a first interface (I1) associated with a first access network/network path (e.g., cellular) or preferring a second interface (I2) associated with a second access network/network path (e.g., Wi-Fi, or vice-versa) can be used for combined policy/rules generation using a preference-based combining algorithm. For such binary combining, any conflict resulting from combining a first policy (P1) with a second policy (P2) may result in returning an IND outcome.

For FIG. 4, each policy P1 and P2 may include rules indicating preferences associated sending packets over a first interface (I1) (e.g., Wi-Fi) or a second interface (I2) (e.g., cellular or vice-versa). For the embodiment of FIG. 4, table 400 illustrates example combined policy 410 including combined rules 412 (cells of the table) in which conventional XACML can be applied in a combining process that utilizes a multipath 'Interface1-Overides' preference-based policy combining algorithm (e.g., I1>I2>IND>NA).

Although generating combined policies/rules in which a preference for one interface over another may be useful for aligning uplink and downlink transmissions to a same interface, in some embodiments, a binary decision may be insufficient for selection of access networks/network paths for communicating application flows. 3GPP networking environment involving Access Network Discovery and Selection Function (ANDSF) operations are typically limited to a binary type access network decision in which only one access network may be selected for a type of flow. However, in some instances, non-binary or 'fuzzy' decisions may be advantageous in order to enable a combination of access networks/network paths to be utilized communications involving for one or more types of application flows.

Accordingly, in some embodiments provided herein more than one access network/network path may be identified for combined policies/rules that may be generated in which a combination of access networks/network paths can be utilized for transmissions for one or more application flows. For example, in some instances a combined rule may provide for the ability to send packets over both a first interface (I1) and a second interface (I2). In still some instances, a combined rule may provide for the ability to send packets over either the first interface (I1) or the second interface (I2).

Thus, conventional XACML policy combining processes can be enhanced or extended to facilitate preference-based policy combining processes to generate a combined policy that permits more than one access network/network path to be utilized for communicating packet flows. For such preference-based policy combining process, consider that a symbol '⋏' represents an 'and' combination while a symbol '⋎' represents an 'or' combination such that 'I1⋏I2' can represent a decision or preference to send transmissions over both I1 and I2 while 'I1⋎I2' can represent a decision or preference to send transmissions over either I1 or I2.

In some embodiments, a 'weak consensus' preference-based policy combining algorithm can be defined in which sub-policies or rules should not conflict with each other such that a request is permitted if some sub-policies/rules permit a request and no sub-policy/rule denies it. Further, a request is denied if some sub-policies/rules deny a request and no sub-policy/rule permits it. Additionally, a value indicating conflict (CF) is yielded if some permit and some deny.

Further, consider that policy purpose can be encoded in interface policy. For example, a cost (C) purpose can be encoded such that 'C1' may represent a cost rule selection of the first interface (I1) and 'C2' may represent a cost rule selection of the second interface (I2). In another example, a load (L) purpose can be encoded such that 'L1' may represent a load rule selection of the first interface (I1) and 'L2' may represent a load rule selection of the second interface (I2). In yet another example, a resiliency (R) purpose can be encoded such that 'R1' may represent a resilience rule selection of the first interface (I1) and 'R2' may represent a resilience rule selection of the second interface (I2). In yet another example, a load (L) purpose can be encoded such that 'L1' may represent a load rule selection of the first interface (I1) and 'L2' may represent a load rule selection of the second interface (I2).

Referring to FIG. 5, FIG. 5 is a table 500 illustrating example details associated with a combining process for combining a cost-purpose policy 502 with a load-purpose policy 504 according to a cost (C) overrides load (L) combining algorithm C>L in order to generate a combined policy 510 utilizing purpose that includes a number of combined rules 512, according to an example embodiment.

Referring to FIGS. 6A, 6B, and 6C, FIGS. 6A, 6B, and 6C are various tables 600, 620, and 640 illustrating a combining process for combining various purpose-based policies according to a cost first preference combining algorithm, such as C>L>R>P, representing a ranked list of policy purposes according to an example embodiment. In particular, FIGS. 6A-6C illustrate example details that may be associated with a hierarchical combining process for achieving the combining utilizing the ranked list of policy purposes.

FIG. 6A is a table 600 illustrating example details associated with a combining process for combining a cost-purpose (C) policy 602 with a load-purpose (L) policy 604 according to a combining algorithm C>L in order to generate a combined policy 610 that includes a number of combined rules 612 according to an example embodiment.

FIG. 6B is a table 620 illustrating example details associated with a combining process for combining a resilience-purpose (R) policy 622 with a performance-purpose (P) policy 624 according to a combining algorithm R>P in order to generate a combining policy 630 that includes a number of combined rules 632 according to an example embodiment.

Finally, FIG. 6C is a table 640 illustrating example details associated with a combining process for combining the cost/load (CL) combined policy 642 of table 600 (combined policy 610 for C>L) with the resiliency/performance (RP) combined policy 644 of table 620 (combined policy 630 for R>P) in order to generate a combined policy 650 that includes a number of combined rules 652 combined according the combining algorithm C>L>R>P, according to an example embodiment.

Referring to FIGS. 7A and 7B, FIGS. 7A and 7B are various tables 700 and 720 illustrating a combining process for combining various purpose-based policies according to a cost (C) first over consensus preference combining algorithm, such as C>Weak_Consensus{L,R,P}, representing a ranked list of policy purposes according to an example embodiment.

FIG. 7A is a table 700 illustrating example details associated with a combining process for combining a resilience-purpose (R) policy 702 with a performance-purpose (P) policy 704 according to a weak consensus combining algorithm in order to generate a combined policy 710 that includes a number of combined rules 712 according to an example embodiment.

FIG. 7B is a table 720 illustrating example details associated with a combining process for combining a cost-purpose (C) policy 722 with a weak consensus load/resilience/performance policy combined policy 724 in order to generate a combined policy 730 that includes a number of combined rules 732 combined according the combining algorithm C>Weak_Consensus{L,R,P}, according to an example embodiment.

The example policy combinations utilizing illustrated in FIGS. 5, 6A-6C, and 7A-7B are only a few of the many policy combinations that may be generated using techniques presented herein and are not meant to limit the broad scope of the present disclosure. Virtually any other policy combinations can be envisioned utilizing any purpose-based combining algorithms and, thus, are clearly within the scope of the present disclosure.

Figure 8:
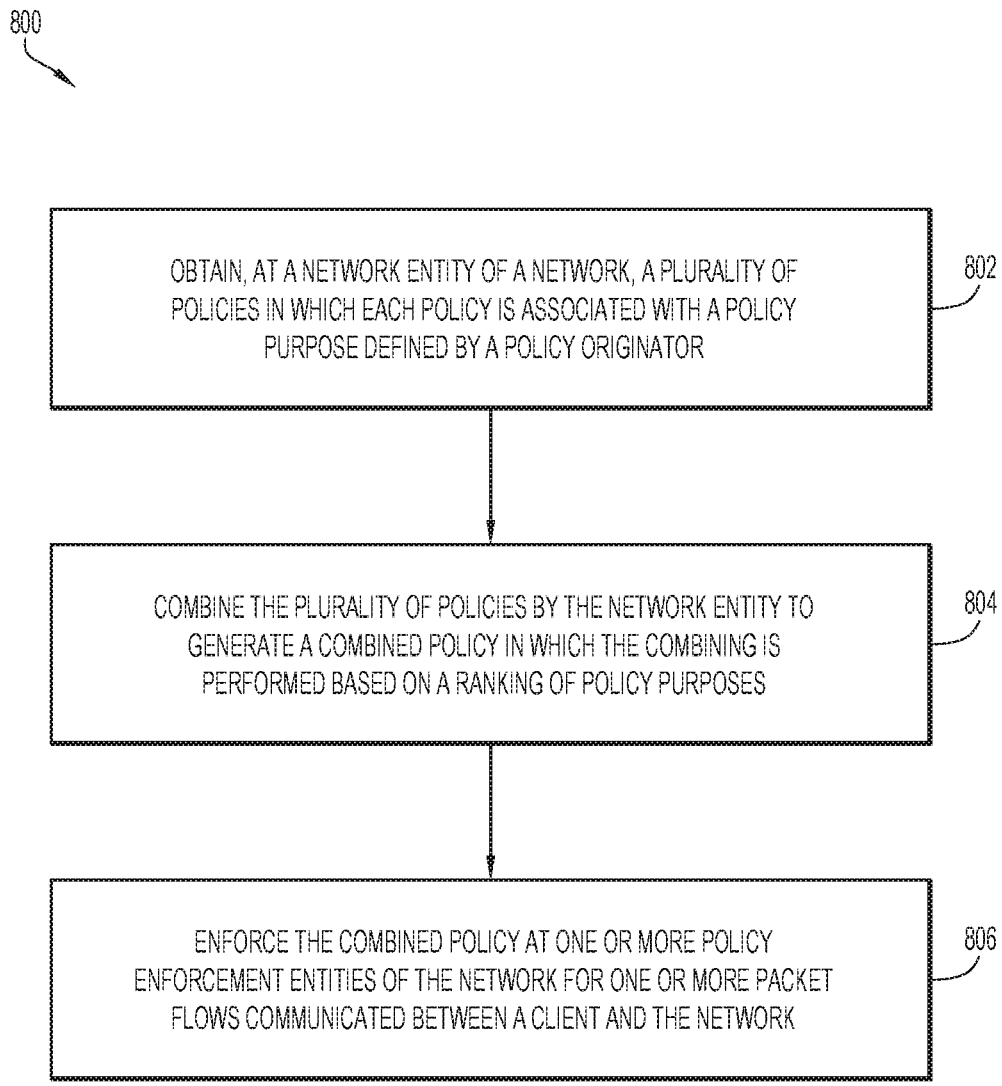
FIG. 8 is a flow chart depicting a method, according to an example embodiment.

Referring to FIG. 8, FIG. 8 is a flow chart depicting a method 800 according to an example embodiment. In particular, method 800 illustrates example operations that may be performed by a network entity (e.g., any combination of client 110, network/transport layer entities 132, control plane entities 136, multipath server proxy function 144, and/or policy combining function 138) to provide policy combining and enforcement features as discussed for techniques presented herein.

At 802, the method may include obtaining, at a network entity of a network, a plurality of policies in which each policy is associated with a policy purpose defined by a policy originator. In one example embodiment, each policy may identify one or more network paths for which one or more packet flows are to be communicated between a client and the network.

At 804, the method may include combining the plurality of policies by the network entity to generate a combined policy, wherein the combining is performed based on a ranking of policy purposes. In some instances, the method may further include obtaining, by the network entity, the ranking of policy purposes for the combining in which the ranking of policy purposes is obtained from at least one of: a configuration provided for the network entity; the client; a user plane function or a control plane function of the network; an application server function; and a multipath server proxy function.

In various implementations, the ranking of policy purposes can be associated with two or more policy purposes selected from a group consisting of: a cost purpose associated with one or more packet flows; a resiliency purpose associated with one or more packet flows; a load purpose associated with one or more packet flows; and a performance purpose associated with one or more packet flows.

In some embodiments, the combining at 804 may be performed using hierarchical combining processes. For example, a first set of policies may be combined according to a first combining algorithm utilizing first policy purposes (e.g., ranked policy purposes) associated with the first set of policies by a first network entity (e.g., multipath client proxy function 112 of client 110) to generate a first combined policy. A second set of policies may be combined according to a second combining algorithm utilizing second policy purposes (e.g., ranked policy purposes) associated with the second set of policies by a second network entity (e.g., OS/transport layer 116 of client 110) to generate a second combined policy. The first and second combined policies may be further combined by a third network entity (e.g., policy combining logic 320 of client 110 or any other network entity including, but not limited to, the first and second network entities) according to a first combining algorithm utilizing first policy purposes (e.g., ranked policy purposes) associated with the first set and second set of policies to generate a third combined policy. Any hierarchical combining processes may be utilized in accordance with embodiments described herein.

At 806, the method may include enforcing the combined policy at one or more policy enforcement entities of the network for one or more packet flows communicated between the client and the network. In some instances, the network entity at which the obtaining and the combining are performed may be at least one policy enforcement entity of the one or more policy enforcement entities. In still some instances, the network entity at which the obtaining and the combining are performed may be external to at least one policy enforcement entity of the one or more policy enforcement entities and the method may further include communicating the combined policy to the at least one policy enforcement entity of the one or more policy enforcement entities.

Figure 9:
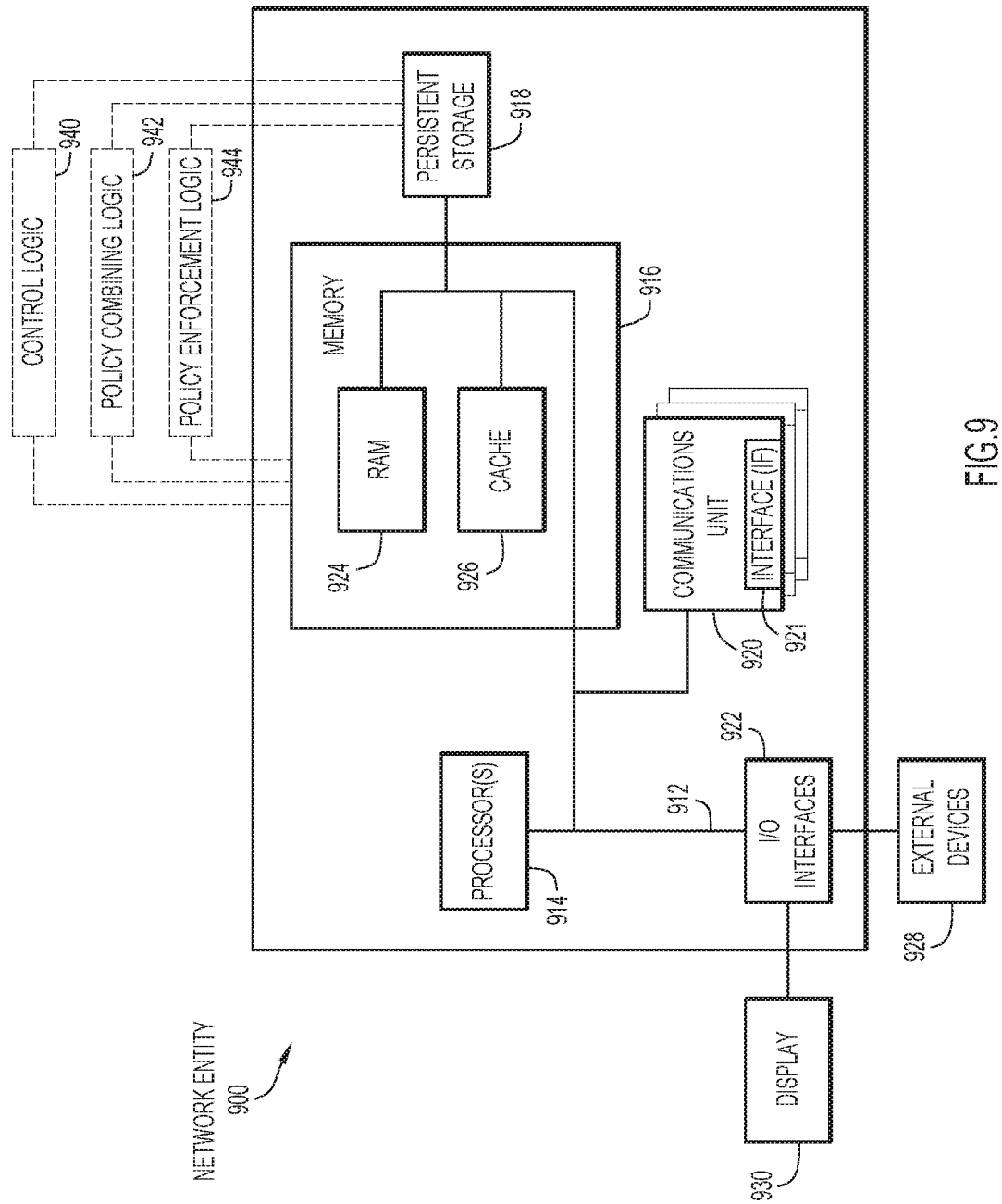
FIG. 9 is a hardware block diagram of a computing device that may perform functions associated with policy combining operations, in connection with the techniques depicted in FIGS. 1-8.

Referring to FIG. 9, FIG. 9 illustrates a hardware block diagram of a computing device 900 that may perform functions for policy combining utilizing purpose (e.g., of client 110, network/transport layer entities 132, control plane entities 136, multipath server proxy function 144, and/or policy combining function 138), referred to herein in connection with FIGS. 1-8. It should be appreciated that FIG. 9 provides only an illustration of one embodiment and does not imply any limitations with regard to the environments in which different embodiments may be implemented. Many modifications to the depicted environment may be made.

As depicted, the computing device 900 includes a bus 912, which provides communications between computer processor(s) 914, memory 916, persistent storage 918, one or more communications units 920, and input/output (I/O) interface(s) 922. Bus 912 can be implemented with any architecture designed for passing data and/or control information between processors (such as microprocessors, communications and network processors, etc.), system memory, peripheral devices, and any other hardware components within a system. For example, bus 912 can be implemented with one or more buses.

Memory 916 and persistent storage 918 are computer readable storage media, which can be inclusive on non-transitory computer readable storage media. In the depicted embodiment, memory 916, which may be inclusive of one or more memory element(s), includes random access memory (RAM) 924 and cache memory 926. In general, memory 916 can include any suitable volatile or non-volatile computer readable storage media. Instructions for any combination of control logic 940, policy combining logic 942, and/or policy enforcement logic 944 may be stored in memory 916 and/or persistent storage 918 for execution by processor(s) 914.

When the processor(s) 914 execute any combination of control logic 940, policy combining logic 942, and/or policy enforcement logic 944, the processor(s) 614 are caused to perform the operations described above in connection with FIGS. 1-8 such as, for example, obtaining policies and corresponding policy purposes (e.g., through configuration, exchanges, signaling, etc. with one or more other entities, etc.), combining policies according to a combining algorithm that may comprise a ranked or otherwise ordered (e.g., prioritized) list of policy purposes, enforcing combined policies for one or more application flows (if the computing device is configured as a policy enforcement entity), and/or any other operations as discussed for embodiments described herein.

One or more programs and/or other logic may be stored in persistent storage 918 for execution by one or more of the respective computer processors 914 via one or more memory element(s) of memory 916. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

Communications units 920, in these examples, provides for communications with other data processing systems, networks, and/or devices. In these examples, each communications unit 920 may include at least one interface (IF) 921, which may facilitate communications with systems, networks, and/or devices utilizing any combination of cellular hardware, software, etc. (e.g., 4G radios, 5G radios, etc. as discussed herein), Wi-Fi hardware, software, etc. (e.g., Wi-Fi radios, etc. as discussed herein), wired hardware, software, etc. (e.g., network interface cards, etc.) to facilitate one or more connections for communications discussed herein. Accordingly, communications units 920 may provide communications through the use of any combination of physical and/or wireless communications links.

I/O interface(s) 922, which may be inclusive of one or more network interface cards (NICs), allows for input and output of data with other devices that may be connected to computing device 900. For example, I/O interface 922 may provide a connection to external devices 928 such as a keyboard, keypad, a touch screen, and/or some other suitable input device. External devices 928 can also include portable computer readable storage media such as database systems, thumb drives, portable optical or magnetic disks, and memory cards.

Software and data used to practice embodiments can be stored on such portable computer readable storage media and can be loaded onto persistent storage 918 via I/O interface(s) 922. I/O interface(s) 922 may also connect to a display 930. Display 930 provides a mechanism to display data to a user and may be, for example, a computer monitor.

In one form, a computer-implemented method is provided that may include obtaining, at a network entity of a network, a plurality of policies, wherein each policy is associated with a policy purpose defined by a policy originator; combining the plurality of policies by the network entity to generate a combined policy, wherein the combining is performed based on a ranking of policy purposes; and enforcing the combined policy at one or more policy enforcement entities of the network for one or more packet flows communicated between a client and the network.

In some implementations, each policy may identify one or more network paths for which one or more packet flows are to be communicated between the client and the network. In some instances, each of a network path of the one or more network paths can associated with a particular access network type. In some implementations, the network entity at which the obtaining and the combining are performed may be at least one policy enforcement entity of the one or more policy enforcement entities. In still some implementations, the network entity at which the obtaining and the combining are performed may be external to at least one policy enforcement entity of the one or more policy enforcement entities and the method may further include communicating the combined policy to the at least one policy enforcement entity of the one or more policy enforcement entities.

In at least one implementation, the method may further include obtaining, by the network entity, the ranking of policy purposes for the combining, wherein the ranking of policy purposes is obtained from at least one of: a configuration provided for the network entity; the client; a user plane function or a control plane function of the network; an application server function; and a multipath server proxy function.

In at least one implementation, the network entity is a first network entity and the obtaining may further include exchanging a set of policies between the first network entity and a second network entity. In such an implementation, the combining may further include combining the set of policies by each of the first network entity and the second network entity to generate the combined policy at each of the first network entity and the second network entity. In some instances, the first network entity may be a first policy enforcement entity and the second network entity may be a second policy enforcement entity.

In various implementations, at least one policy enforcement entity may be at least one of: the client; a multipath server proxy function; and at least one user plane function of the network.

In at least one implementation, the ranking of policy purposes may be associated with two or more policy purposes selected from a group consisting of: a cost purpose associated with one or more packet flows; a resiliency purpose associated with one or more packet flows; a load purpose associated with one or more packet flows; and a performance purpose associated with one or more packet flows.

In summary, techniques presented herein provide a system, apparatus, and/or method that enables policies to be combined from different policy originators in a manner that takes into account a purpose used by the originator in defining its policy. A ranked or otherwise ordered list of policy purposes can be utilized to determine how to combine different policies to generate a uniform policy that can be consistently applied at one or more policy enforcement points.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein (e.g., policies and corresponding policy purposes exchanged or otherwise obtained, combined policies, combining algorithms, etc.) may be stored within any conventional or other data structures (e.g., files, arrays, lists, stacks, queues, records, etc.) and may be stored in any desired storage unit (e.g., database, data or other repositories, queue, etc.). The data or information transmitted between entities (e.g., policies and corresponding policy purposes exchanged or otherwise obtained, combined policies, combining algorithms, etc.) may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function (s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining, at a network entity of a network, a plurality of policies from a plurality of policy originators, wherein each of a corresponding policy of the plurality of policies includes a corresponding policy purpose indication that identifies a corresponding purpose for each corresponding policy as defined by each corresponding policy originator of the plurality of policy originators, and wherein each corresponding policy identifies a plurality of network paths for which one or more packet flows for an application are to be communicated between a client device and the network, and each network path of the plurality of network paths is associated with a radio access network type;

combining the plurality of policies by the network entity to generate a combined policy including a plurality of combined rules indicating at least one network path associated with at least one radio access network type that is to be utilized for the one or more packet flows for the application, wherein the combining is performed using a hierarchical combining process that is based on a ranking of at least two different policy purposes in which a first policy purpose overrides at least one second policy purpose to generate the combined policy including the plurality of combined rules; and enforcing the combined policy at a plurality of policy enforcement entities of the network for the one or more packet flows for the application communicated between the client device and the network, wherein the enforcing comprises selecting, based on the application and the combined policy, an interface associated with the at least one network path for at least one radio access network type for transmitting the one or more packet flows for the application utilizing the at least one radio access network type and wherein the at least one radio access network type is at least one of a wireless local area network and a cellular access network.

2. The method of claim 1, wherein the network entity at which the obtaining and the combining are performed is at least one policy enforcement entity of the plurality of policy enforcement entities.

3. The method of claim 1, wherein the network entity at which the obtaining and the combining are performed is external to at least one policy enforcement entity of the plurality of policy enforcement entities, the method further comprising:
communicating the combined policy to the at least one policy enforcement entity of the plurality of policy enforcement entities.

4. The method of claim 1, further comprising:
obtaining, by the network entity, the ranking of the at least two different policy purposes for the combining, wherein the ranking of the at least two different policy purposes is obtained from at least one of:
a configuration provided for the network entity;
the client device;
a user plane function or a control plane function of the network;
an application server function; and
a multipath server proxy function.

5. The method of claim 1, wherein the network entity is a first network entity, the obtaining further comprises exchanging a set of policies between the first network entity and a second network entity and the combining further comprises combining the set of policies by each of the first network entity and the second network entity based on the ranking of the at least two different policy purposes to generate a respective combined policy at each of the first network entity and the second network entity.

6. The method of claim 5, wherein the first network entity is a first policy enforcement entity of the plurality of policy enforcement entities and the second network entity is a second policy enforcement entity of the plurality of policy enforcement entities.

7. The method of claim 1, wherein the ranking of the at least two different policy purposes is associated with at least two different policy purposes selected from a group consisting of:
a cost purpose associated with one or more packet flows for the application;
a resiliency purpose associated with one or more packet flows for the application;
a load purpose associated with one or more packet flows for the application; and
a performance purpose associated with one or more packet flows for the application.

8. The method of claim 1, wherein at least one combined rule of the plurality of combined rules includes a non-binary rule indicating that the one or more packet flows for the application can be communicated over two different radio access network types.

9. The method of claim 8, wherein the non-binary rule indicates that the one or more packet flows for the application can be communicated using both a first radio access network type and a second radio access network type or using either a first radio access network type or a second radio access network type.

10. The method of claim 1, wherein a particular policy originator for a particular policy having a particular policy purpose is provided by an application provider of the application.

11. The method of claim 1, wherein the application is a non-multipath aware application.

12. The method of claim 1, wherein a first policy enforcement entity of the plurality of policy enforcement entities is the client device and a second policy enforcement entity of the plurality of policy enforcement entities is a user plane function of the network or a multipath server proxy function.

13. The method of claim 1, wherein a first policy obtained from a first policy originator of the plurality of policy originators includes the first policy purpose indicated within a flag type for the first policy.

14. One or more non-transitory computer readable storage media encoded with instructions that, when executed by a processor, cause the processor to perform operations, comprising:
obtaining, at a network entity of a network, a plurality of policies from a plurality of policy originators, wherein each of a corresponding policy of the plurality of policies includes a corresponding policy purpose indication that identifies a corresponding purpose for each corresponding policy as defined by each corresponding policy originator of the plurality of policy originators, and wherein each corresponding policy identifies a plurality of network paths for which one or more packet flows for an application are to be communicated between a client device and the network, and each network path of the plurality of network paths is associated with a radio access network type;
combining the plurality of policies by the network entity to generate a combined policy including a plurality of combined rules indicating at least one network path associated with at least one radio access network type that is to be utilized for the one or more packet flows for the application, wherein the combining is performed using a hierarchical combining process that is based on a ranking of at least two different policy purposes in which a first policy purpose overrides at least one second policy purpose to generate the combined policy including the plurality of combined rules; and enforcing the combined policy at a plurality of policy enforcement entities of the network for the one or more packet flows for the application communicated between client device and the network, wherein the enforcing comprises selecting, based on the application and the combined policy, an interface associated with the at least one network path for at least one radio access network type for transmitting the one or more packet flows for the application utilizing the at least one radio access network type and wherein the at least one radio access network type is at least one of a wireless local area network and a cellular access network.

15. The media of claim 14, wherein the instructions, when executed by the processor, cause the processor to perform further operations, comprising:
obtaining, by the network entity, the ranking of the at least two different policy purposes for the combining, wherein the ranking of the at least two different policy purposes is obtained from at least one of:
a configuration provided for the network entity;
the client device;
a user plane function or a control plane function of the network;
an application server function; and
a multipath server proxy function.

16. The media of claim 14, wherein the ranking of the at least two different policy purposes is associated with at least two different policy purposes selected from a group consisting of:
a cost purpose associated with one or more packet flows for the application;
a resiliency purpose associated with one or more packet flows for the application;
a load purpose associated with one or more packet flows for the application; and
a performance purpose associated with one or more packet flows for the application.

17. A system comprising:
at least one memory element for storing data; and
at least one processor for executing instructions associated with the data, wherein executing the instructions causes the system to perform operations, comprising:
obtaining, at a network entity of a network, a plurality of policies from a plurality of policy originators, wherein each of a corresponding policy of the plurality of policies includes a corresponding policy purpose indication that identifies a corresponding purpose for each corresponding policy as defined by each corresponding policy originator of the plurality of policy originators, and wherein each corresponding policy identifies a plurality of network paths for which one or more packet flows for an application are to be communicated between a client device and the network, and each network path of the plurality of network paths is associated with a radio access network type;
combining the plurality of policies by the network entity to generate a combined policy including a plurality of combined rules indicating at least one network path associated with at least one radio access network type that is to be utilized for the one or more packet flows for the application, wherein the combining is performed using a hierarchical combining process that is based on a ranking of at least two different policy purposes in which a first policy purpose overrides at least one second policy purpose to generate the combined policy including the plurality of combined rules; and
enforcing the combined policy at a plurality of policy enforcement entities of the network for the one or more packet flows for the application communicated between the client device and the network, wherein the enforcing comprises selecting, based on the application and the combined policy, an interface associated with the at least one network path for at least one radio access network type for transmitting the one or more packet flows for the application utilizing the at least one radio access network type and wherein the at least one radio access network type is at least one of a wireless local area network and a cellular access network.

18. The system of claim 17, wherein the network entity at which the obtaining and the combining are performed is at least one policy enforcement entity of the plurality of policy enforcement entities.

19. The system of claim 17, wherein the network entity at which the obtaining and the combining are performed is external to at least one policy enforcement entity of the plurality of policy enforcement entities, wherein executing the instructions causes the system to perform further operations, comprising:
communicating the combined policy to the at least one policy enforcement entity of the plurality of policy enforcement entities.

20. The system of claim 17, wherein the ranking of the at least two different policy purposes is associated with at least two different policy purposes selected from a group consisting of:
a cost purpose associated with one or more packet flows for the application;
a resiliency purpose associated with one or more packet flows for the application;
a load purpose associated with one or more packet flows for the application; and
a performance purpose associated with one or more packet flows for the application.

* * * * *